March 7, 1939.　　　J. W. SHIELDS　　　2,150,107
TRACTOR WHEEL
Filed April 11, 1935
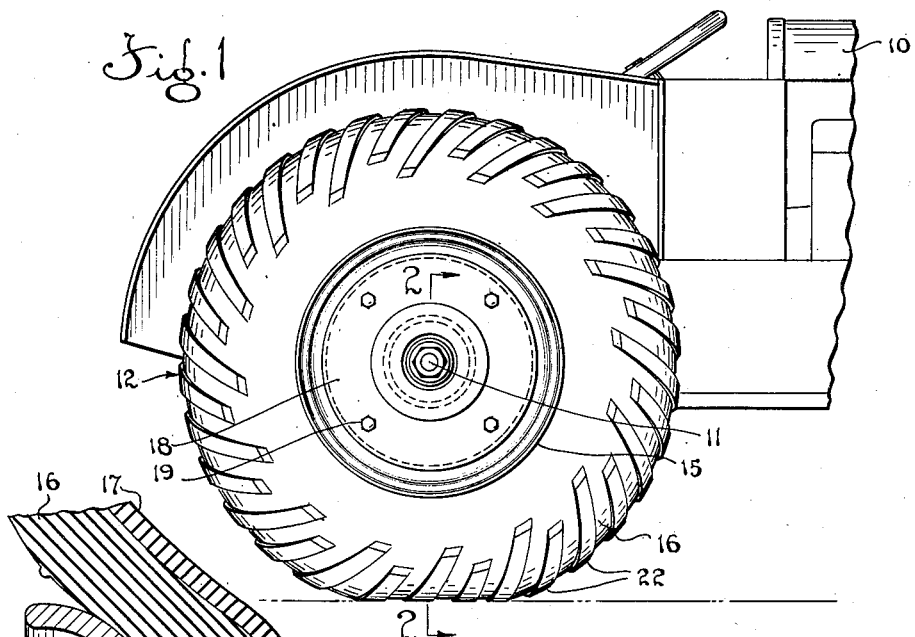
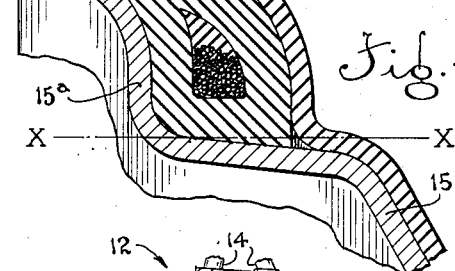
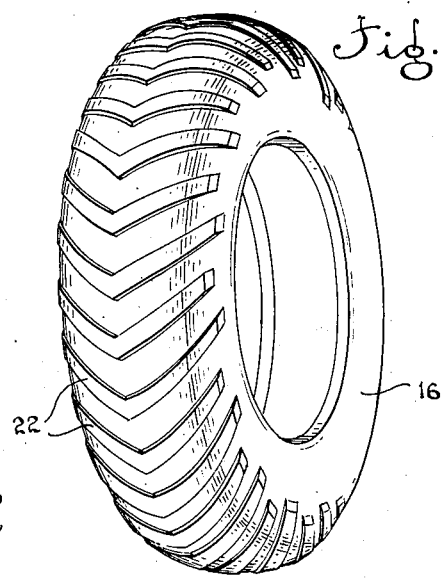
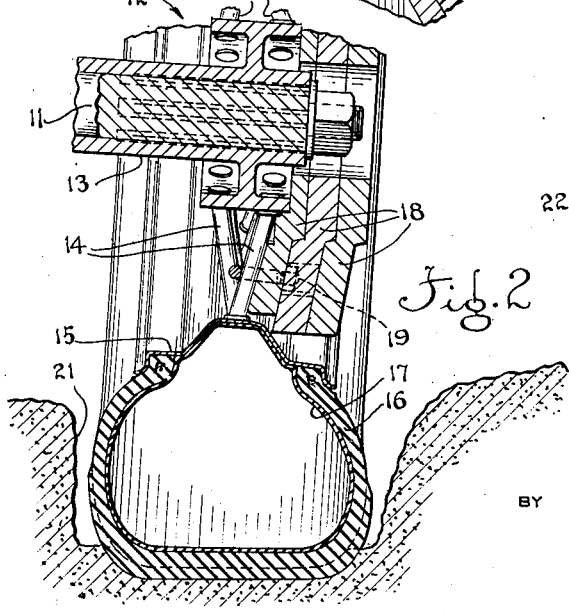
INVENTOR
Jesse W. Shields
BY　Albert L. Ely
ATTORNEY Patented Mar. 7, 1939

2,150,107

UNITED STATES PATENT OFFICE 2,150,107

TRACTOR WHEEL

Jesse W. Shields, Akron, Ohio, assignor to The Firestone Tire & Rubber Company, Akron, Ohio, a corporation of Ohio Application April 11, 1935, Serial No. 15,755

4 Claims. (Cl. 301—41)

This invention relates to tractor wheels for use on the driving wheels, at least, of agricultural tractors, and more especially it relates to tractor wheels equipped with pneumatic tires.

Tractor wheels require to be able to carry weight or ballast to the extent of about 450 pounds per wheel to assure adequate driving traction, and when metal wheels are employed it is customary to equip them with cleats. Tractors equipped with cleated metal wheels are hard riding, and the cleats are injurious to pavements and the floors of farm buildings, and injure and tear up the turf when driven through meadows and orchards. The said cleats also throw dirt over the operator and tractor, thus fouling the oil and grease of the latter and increasing the cost of its upkeep.

The foregoing objections to metal wheels are overcome by the use of pneumatic rubber tires on tractor wheels. The use of pneumatic tires for the purpose specified is not, however, without attendant difficulties. For example, it is desirable that the tire be of large cross section so that adequate traction is obtained, yet it is also necessary that the tire be narrower than the standard furrow, which is 14 inches, so that the wheel will not climb out of the furrow, or unduly compact the sides thereof. The excessive torque to which the tire is subjected will result in relative movement between the tire and rim unless means is provided for preventing it. Furthermore, it is desirable that the tread of the tire be formed with a tread design that has good ground-gripping characteristics, and preferably is self-cleaning.

The chief objects of the invention are to provide an improved tractor wheel including a pneumatic tire thereon; to effect economy of operation by making it possible for tractors to travel at higher speed, thereby increasing the amount of work accomplished and reducing the cost of fuel; to reduce the rolling resistance and appreciably increase the drawbar pull of tractors, thereby making them capable of drawing heavier loads; to avoid injury to highways and building floors and to prevent tearing up of the soil; to avoid undue packing of the soil; to reduce vibration of the tractor, thereby reducing depreciation and making operation of the tractor less fatiguing to the operator; to provide a wheel of maximum traction that is self-cleaning, and which will not throw dirt over the tractor and its operator; to provide a wheel of the character mentioned that will fit easily within a standard furrow; and to provide a construction that will resist movement of the tire relatively of the wheel. Other objects will be manifest.

Of the accompanying drawing:

Figure 1 is a side elevation of the rear end portion of an agricultural tractor equipped with the improved tractor wheel, in its preferred form;

Figure 2 is a section, on a larger scale, on the line 2—2 of Figure 1;

Figure 3 is a front perspective view of the tire used upon the improved tractor wheel; and Figure 4 is a full size fragmentary sectional view of one of the bead-seating portions of the tire rim of the improved wheel, and the bead portion of a tire seated thereon.

Referring to the drawing, 10 is a tractor of any known or preferred make, 11 is the driving axle thereof, and 12 designates generally one of the improved wheels mounted upon said axle. As is most clearly shown in Figure 2, the wheel 12 comprises a hub portion 13, spokes 14, 14, a drop-center tire rim 15, a pneumatic tire casing 16 and an inner tube 17 mounted on said tire rim, and traction weights 18, 18 mounted upon the side of the wheel and secured to the spokes 14 or to each other by bolts or cap screws 19, 19. The weights 18 may be added or removed as the condition of the roadways or soil warrants.

The width of the tire 16 is somewhat less than 14 inches so that it may travel easily in a standard furrow as indicated at 21, Figure 2. The air pressure in the tire 16 is relatively low, averaging about 12 pounds, with the result that the tire flattens both longitudinally and transversely under load, as shown, and thus provides a relatively large area of its surface for contact with the ground. The arrangement is such that the pressure on the underlying soil may be kept as low as 12 pounds to the square inch, thereby avoiding packing of the soil beneath the tire, and providing adequate traction for the tire.

The tractive qualities of the tires 16 are further enhanced by the tread design on the outer periphery thereof, said design consisting of parallel bars or ribs 22, 22 disposed obliquely with relation to the centerline of the tread and extending to the respective sides of said tread. The ribs 22 on one side of the centerline of the tread are disposed at an angle to those on the opposite side thereof, and the respective ribs of each group meet those of the opposite group at the centerline of the tire so as to define a series of V-shaped figures or chevrons. The tire 16 is so mounted on the rim 15 that the points or apexes of the chevrons are directed rearwardly when they are in contact with the ground. Thus as the tire moves forwardly, mud and dirt which fills the grooves between the ribs 22 is worked outwardly to the sides of the tire with the result that the tire automatically cleans itself and its tractive ability is maintained at the maximum.

Referring now to Figure 4 of the drawing, wherein is shown one of the bead portions of tire 16 and a bead-seating portion of tire rim 15, there is a line $x$—$x$ that is parallel to the axis (not shown) of said tire and rim. By comparison with the line $x$—$x$ it will be seen that the bead-seating portion of the rim is tapered, and is substantially of ⅛ in. greater radius adjacent the lateral flange 15a than it is at the central well of the rim. The diametral face of the tire bead that engages the rim 15 is tapered complementally to the rim, with the result that when the tire is mounted on the rim and inflated the bead portions of the tire will be urged laterally and into wedging engagement with the rim. The increased friction due to such wedging engagement is sufficient to resist torsional strains set up during operation of the wheel, and relative movement between the tire and rim is prevented.

Experience has shown that tractors equipped with the improved tractor wheels can do the same work as performed by tractors with steel wheels in 80% of the time. The invention also reduces the cost of repairs to the tractor by half, and effects a saving of fuel conservatively estimated at 20%.

Modification may be resorted to without departing from the spirit of the invention or the scope of the appended claims.

What is claimed is:

1. A power-driven tractor wheel comprising a series of removable weights attached to the wheel, a flexible pneumatic tire inflated to such low pressure as to be so flattened at its region of contact with the ground by said weights as to provide a tractive area substantially as wide as said tire, and a tire rim on which said tire is mounted, said rim having inclined bead seats of such shape that the beads of the tire are distended and wedged thereonto sufficiently securely by said low pressure as to overcome the tendency of the tractive force to produce slippage between the rim and the tire.

2. A power-driven tractor wheel comprising a tire rim, and a pneumatic tire thereon, said tire rim having bead-seating portions that are sloped and the beads of the tire having complementally sloped portions that wedge thereon, the internal diameters of said tire beads being normally smaller than the corresponding external diameters of said bead-seating portions of said rim, whereby said beads must be distended into a secure stressed relationship with said rim for imparting the tractive power of said wheel to said tire without slippage.

3. A traction device comprising a wheel having a tire rim, a pneumatic tire thereon, said tire rim having bead-seating portions that are sloped and the beads of the tire having complementally sloped portions that wedge thereon, the internal diameter of said tire beads being normally smaller than the corresponding external diameter of said bead-seating portions of said rim, whereby said beads are distended into frictional driving fit with said bead seats for transmitting the torque from said wheel to said tire, said pneumatic tire having the pressure, section and weight carried thereon so correlated that the tractive area is substantially as wide as the tire section, and said tire having a tread configuration comprising a plurality of substantially parallel traction ribs having portions converging in the direction of rotation for desired maximum traction.

4. A traction device comprising a wheel having a tire rim, a pneumatic tire thereon, said pneumatic tire having the pressure, section and weight carried thereon, so correlated that the tractive area is substantially as wide as the tire section, and said tire having a tread configuration comprising a plurality of traction ribs having portions converging in the direction of rotation for desired maximum traction.

JESSE W. SHIELDS.